Nov. 23, 1948.  J. BORZELL  2,454,626
FIFTH WHEEL COUPLING FOR TRAILERS
Filed Feb. 26, 1947  2 Sheets-Sheet 1

John Borzell
Inventor

Nov. 23, 1948.    J. BORZELL    2,454,626
FIFTH WHEEL COUPLING FOR TRAILERS
Filed Feb. 26, 1947    2 Sheets-Sheet 2
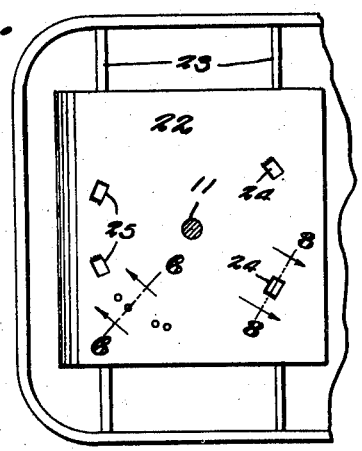
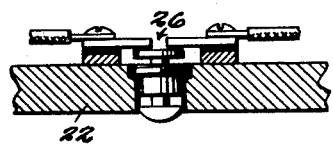
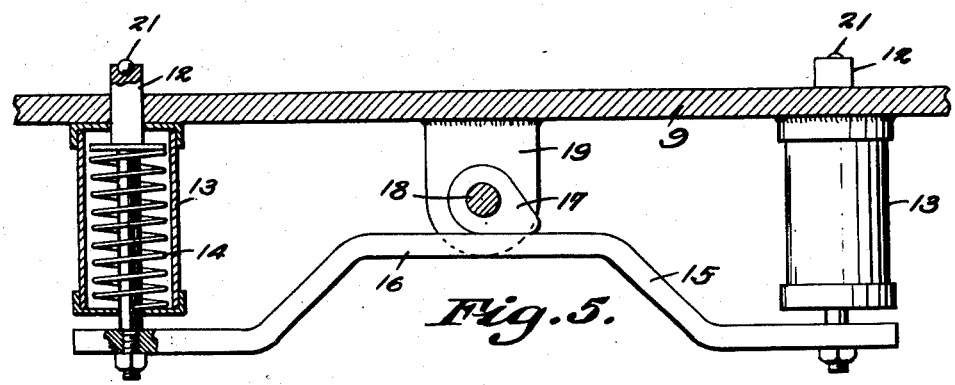
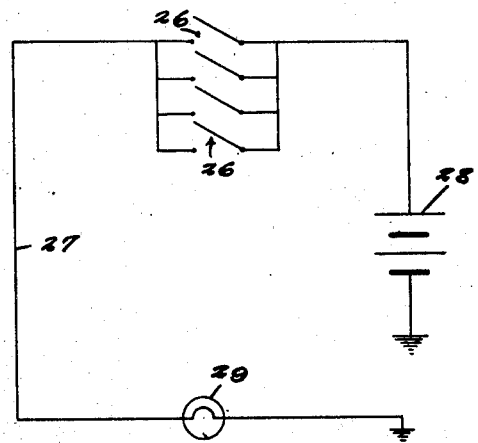
John Borzell
Inventor Patented Nov. 23, 1948

2,454,626

UNITED STATES PATENT OFFICE 2,454,626

FIFTH WHEEL COUPLING FOR TRAILERS

John Borzell, Pittston, Pa.

Application February 26, 1947, Serial No. 730,916

2 Claims. (Cl. 280—33.05)

1

This invention relates to fifth wheel or coupling construction designed for coupling trailers to trucks.

The primary object of the invention is to provide a coupling which will limit the movement of the trailer, with respect to the truck, to prevent the trailer from swinging laterally beyond a predetermined point where the trailer will be prevented from jack-knifing.

An important object of the invention is to provide a device of this character which may be readily and easily attached to the usual truck and trailer construction, eliminating the necessity of making extensive alterations in the fifth wheel construction, to mount the attachment.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 4 is a bottom plan view of the upper plate of the fifth wheel structure, which is carried by the trailer.

Figure 5 is an enlarged elevational view illustrating the stop pins and means for locking the stop pins out of operation.

Figure 6 is a view illustrating the switches used with the electric circuit for signaling to the operator of the truck, when the trailer is out of control.

Figure 7 is a diagram illustrating the electric circuit to the lamp of the vehicle.

Figure 8 is a view illustrating the opening 24 on an enlarged scale.

Figure 1:
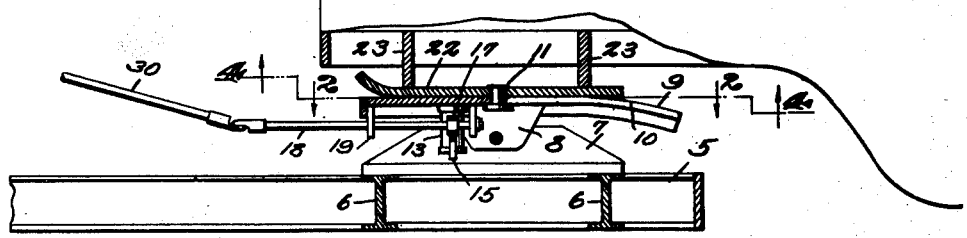
Figure 1 is a sectional view through a fifth wheel of a truck and trailer, illustrating an attachment, constructed in accordance with the invention, as mounted thereon.
Figure 2:
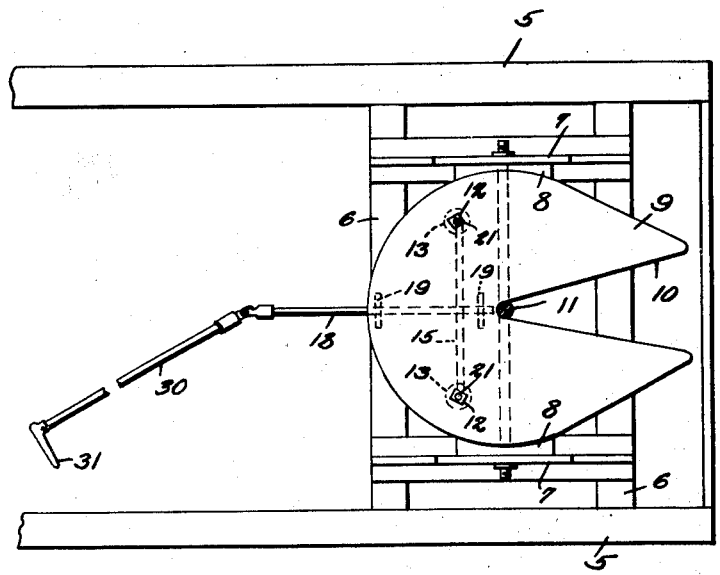
Figure 2 is a plan view of the fifth wheel construction.
Figure 3:
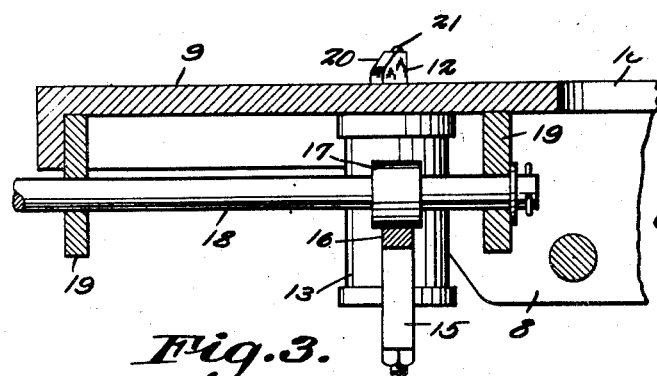
Figure 3 is a sectional detail view illustrating the means for moving the stop pins, to their inactive positions.

Referring to the drawings in detail, the reference character 5 indicates the side rails of the chassis of a truck, and the reference character 6 indicates the transverse bars which connect the side rails of the truck.

Rising from the cross-bars 6 are the pivot plates 7 that cooperate with the downwardly extended pivot plates 8 that are formed on the fifth wheel plate 9 of the truck.

This fifth wheel plate 9 is formed with the usual guide slot 10 through which the king pin 11 of the fifth wheel structure, extends, the usual fastening means being provided for securing the king pin within the slot of the plate 9.

The plate 9 is formed with openings through which the stop pins 12 extend, the stop pins 12 being mounted within the cylindrical housings 13 that are normally urged upwardly, by means of the coiled springs 14, mounted within the housings 13. These housings 13 are welded to the bottom of the plate 9 as clearly shown by Figure 5 of the drawings.

The stop pins 12, are secured to the ends of the bar 15, which extends transversely of the truck chassis, the bar 15 being provided with an upwardly extended offset portion 16 adapted to be engaged by the cam 17 which is secured to one end of the control shaft 18, that extends through the bearings 19 secured directly under the fifth wheel plate 9. Thus, it will be seen that due to this construction, when the shaft 18 is rotated, the bar 15 will be moved downwardly with the result that the stop pins 12 will be moved to positions wherein the upper ends thereof will lie flush with the fifth wheel plate 9.

When the shaft 18 is rotated in the opposite direction, the action of the springs 14, will be to elevate the stop pins to the position as shown by Figure 5.

The upper ends of the stop pins are beveled as at 20, for purposes to be hereinafter more fully described, and anti-friction balls 21 are provided in sockets formed in the upper ends of the pins, to reduce the friction, as the cooperating plate 22 of the fifth wheel structure, moves thereover.

This plate 22 is carried by the trailer, and is secured to the cross-bars 23 of the trailer chassis.

Formed in the plate 22, are openings 24, while opposite thereto, are openings 25, the openings 24 and 25 having one of their respective edges beveled, so that the stop pins 12 may slide thereinto, when the plate and trailer move in one direction, but will provide an inclined edge so that the pins will readily ride out of the openings, when the trailer moves to its normal position in tracking relation with the truck.

Positioned within the plate 22, are switch members 26 which are in circuit with a suitable source of electricity supply, through the wires 27, the circuit being grounded through the chassis of the vehicle, in the usual way. The battery indicated by the reference character 28, is, of course, the usual battery of the truck towing the trailer.

The reference character 29 indicates a lamp which is in the circuit with a contact member 26, the lamp 29 being located preferably on the dash or instrument board of the truck so that it will be visible at all times by the operator.

It might be further stated that these switch members 26 are in the path of travel of the stop pins 12, so that as the trailer swings to the right or left, these stop pins will engage the switch members 26 completing the circuit in such a way as to cause a flickering of the lamp 29, as the trailer swings back and forth.

From the foregoing, it will be seen that due to the construction shown and described, when the trailer equipped with an attachment constructed in accordance with the invention, swings laterally or becomes out of control to the extent that it sways backwardly and forwardly, the stop pins 12 will move into the openings or cut-out portions 24 or 25 which fall directly over the stop pins, restricting further swinging movement of the trailer. Immediately upon this swinging movement of the trailer, the operator will be notified of such movement by said flickering light, so that he can by regulating the speed of his truck, regain control of the trailer.

Should it be desired to throw the stop pins 12 out of use, it is only necessary to rotate the shaft 18 by means of the shaft 30 which is connected with the shaft 18, to move the pins to positions below the upper surface of the plate 9.

The truck may now be maneuvered to cause the truck to move to any desired position with respect to the trailer in making short turns or for short backing.

It will, of course, be understood that the handle 31 may be so located that it may be operated from the cabin of the truck of the device.

In view of the foregoing detailed disclosure, it is believed that further description as to the operation of the fifth wheel construction, is unnecessary.

What is claimed is:

1. In combination with the fifth wheel of a tractor and the fifth wheel plate of a trailer, the fifth wheel plate of the trailer having spaced openings, said fifth wheel having openings, cylindrical housings supported under the fifth wheel directly under the openings of the fifth wheel, stop pins disposed within the cylindrical housings and extended through the openings of the fifth wheel, springs within the housings adapted to normally urge the pins upwardly, said pins adapted to move into the openings of the fifth wheel plate of the trailer preventing angular movement of the trailer with respect to the tractor beyond a predetermined point, and means for moving the pins to their inactive positions.

2. In combination with the fifth wheel of a tractor and the fifth wheel plate of a trailer, the fifth wheel plate of the trailer having spaced openings, said fifth wheel having openings, cylindrical housings supported under the fifth wheel directly under the openings of the fifth wheel, stop pins disposed within the cylindrical housings and extending through the openings of the fifth wheel, springs within the housings adapted to normally urge the pins upwardly into the openings of the fifth wheel plate of the trailer preventing angular movement of the trailer with respect to the tractor beyond a predetermined point, a supporting bar on which the pins are mounted, operating means for operating the pins, comprising a shaft and cam mounted on the shaft, the cam engaging said bar moving the bar against the action of the springs and moving the pins to their inactive positions.

JOHN BORZELL.

REFERENCES CITED

The following references are of record in the file of this patent:

UNITED STATES PATENTS

| Number | Name | Date |
|---|---|---|
| 1,179,793 | Barber | Apr. 18, 1916 |
| 2,073,269 | Skibbe | Mar. 9, 1937 |
| 2,400,738 | Brown | May 21, 1946 |